US012596580B2

(12) United States Patent
Chen et al.

(10) Patent No.: US 12,596,580 B2
(45) Date of Patent: Apr. 7, 2026

(54) METHOD AND SYSTEM FOR OPTIMIZING GPU UTILIZATION

(71) Applicant: ProphetStor Data Services, Inc., Taichung (TW)

(72) Inventors: Wen-Shyen Chen, Taichung City (TW); Ming-Jye Sheu, Saratoga, CA (US); Henry Hong-Yi Tzeng, San Jose, CA (US); Sheng-Lin Wu, Taichung City (TW)

(73) Assignee: ProphetStor Data Services, Inc., Taichung (TW)

( * ) Notice: Subject to any disclaimer, the term of this patent is extended or adjusted under 35 U.S.C. 154(b) by 470 days.

(21) Appl. No.: 18/238,569

(22) Filed: Aug. 28, 2023

(65) Prior Publication Data

US 2025/0077289 A1     Mar. 6, 2025

(51) Int. Cl.
*G06F 3/00* (2006.01)
*G06F 9/50* (2006.01)

(52) U.S. Cl.
CPC ................................. *G06F 9/5038* (2013.01)

(58) Field of Classification Search
CPC ........................................................ G06F 9/48
See application file for complete search history.

(56) References Cited

U.S. PATENT DOCUMENTS

| | | | | |
|---|---|---|---|---|
| 11,863,390 | B1 * | 1/2024 | Menes | H04L 45/488 |
| 2019/0213027 | A1 * | 7/2019 | Bhandari | G06F 9/505 |
| 2019/0324820 | A1 * | 10/2019 | Krishnan | G06F 9/5077 |

| | | | | |
|---|---|---|---|---|
| 2020/0371896 | A1 * | 11/2020 | Mathur | G06F 11/3006 |
| 2021/0136178 | A1 * | 5/2021 | Casey | G06N 20/00 |
| 2021/0142177 | A1 * | 5/2021 | Mallya | G06N 3/082 |
| 2023/0003826 | A1 * | 1/2023 | Parker | G01S 5/0205 |
| 2023/0006889 | A1 * | 1/2023 | Thyagaturu | H04L 41/5054 |
| 2023/0094125 | A1 * | 3/2023 | Rogers | G06F 9/45558 |
| | | | | 713/190 |
| 2023/0097169 | A1 * | 3/2023 | Dwivedi | G06F 18/29 |
| | | | | 706/15 |
| 2024/0224463 | A1 * | 7/2024 | Kalantarian | H05K 7/20836 |
| 2024/0232039 | A1 * | 7/2024 | Isaac | G06N 20/00 |

(Continued)

FOREIGN PATENT DOCUMENTS

| | | | | |
|---|---|---|---|---|
| CN | 113781617 A | * | 12/2021 | G06N 3/045 |
| CN | 114119337 | | 3/2022 | |
| EP | 3816853 A1 | * | 5/2021 | G06V 40/18 |

OTHER PUBLICATIONS

Jacob Freise , Investigating the Tradeoffs of GPUs for Parallel Processes (Year: 2019).*
TW OA from TW11320211950, mailed Feb. 29, 2024.

*Primary Examiner* — Lechi Truong
(74) *Attorney, Agent, or Firm* — Demian K. Jackson; Jackson IPG PLLC

(57) ABSTRACT

The present invention provides a method for optimizing graphics-processing unit (GPU) utilization and a system thereof. The method includes the following steps: receiving an application workload which is to be executed on the GPU; predicting GPU resource requirements for the application workload; scheduling the application workload according to the prediction of the GPU resource requirements; dynamically allocating and deallocating GPU resources based on the prediction of the GPU resource requirements for the application workload; and executing the application workload on the GPU.

19 Claims, 5 Drawing Sheets

(56) References Cited

U.S. PATENT DOCUMENTS

| | | | |
|---|---|---|---|
| 2024/0312122 A1* | 9/2024 | Moenne-Loccoz | ........................... G06T 15/506 |
| 2024/0371073 A1* | 11/2024 | Van | ......................... G06T 15/06 |
| 2025/0209696 A1* | 6/2025 | Jiang | ......................... G06T 3/02 |
| 2025/0216934 A1* | 7/2025 | Kim | ........................ G06V 20/46 |
| 2025/0356398 A1* | 11/2025 | Potdar | ................ G06Q 30/0282 |

* cited by examiner

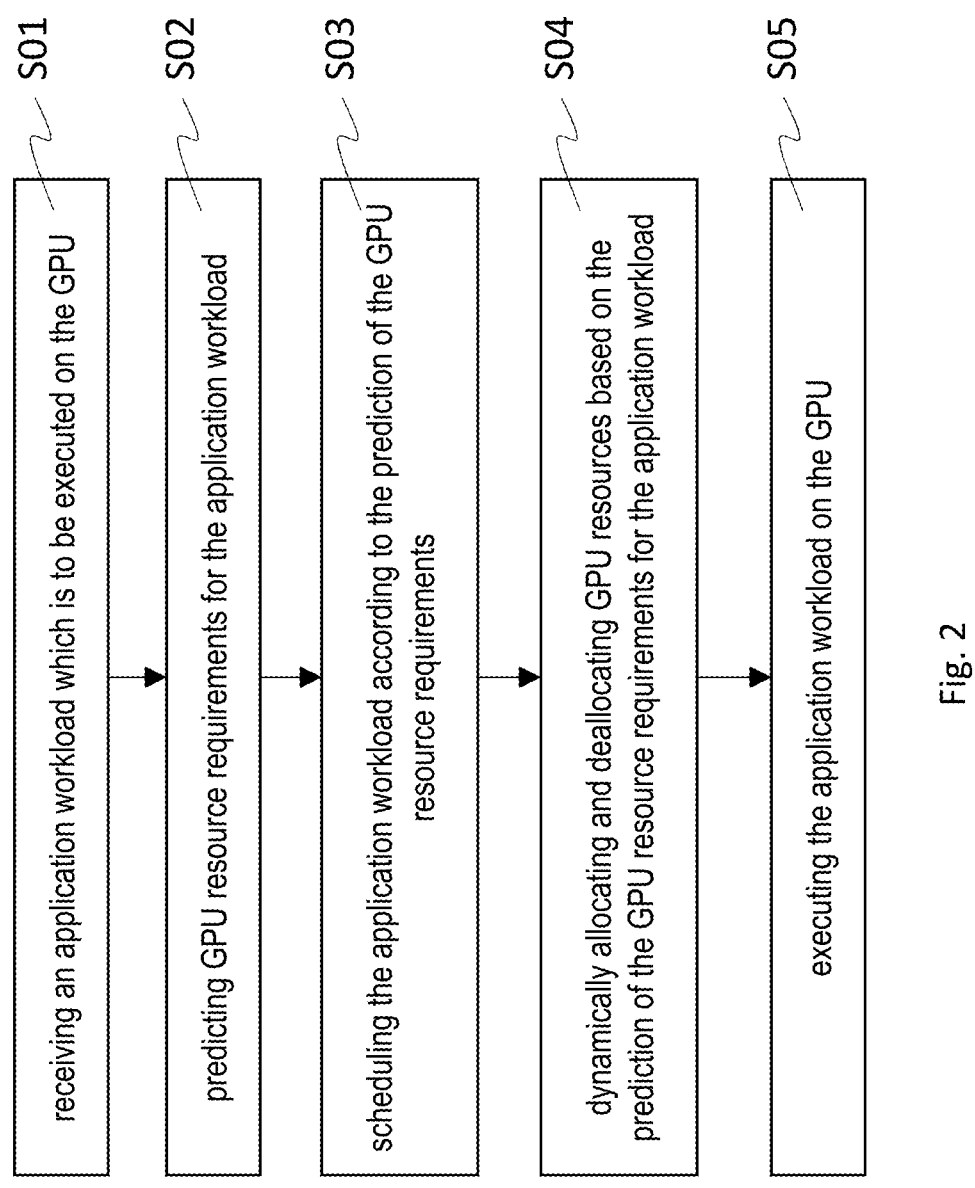

S01 receiving an application workload which is to be executed on the GPU

S02 predicting GPU resource requirements for the application workload

S03 scheduling the application workload according to the prediction of the GPU resource requirements S04 dynamically allocating and deallocating GPU resources based on the prediction of the GPU resource requirements for the application workload S05 executing the application workload on the GPU

Fig. 2

METHOD AND SYSTEM FOR OPTIMIZING GPU UTILIZATION

FIELD OF THE INVENTION

The present invention relates to a method and a system for optimizing graphics-processing unit (GPU) utilization. More particularly, the present invention relates to a method and a system for optimizing GPU utilization.

BACKGROUND OF THE INVENTION

Kubernetes, an open-source platform for automating deployment, scaling, and management of containerized applications, has become the de facto standard for orchestrating containerized workloads in the cloud. However, when it comes to managing GPU resources, Kubernetes faces several challenges.

1. Limited Support for GPU Resources: Kubernetes primarily focuses on CPU and memory resources, with limited built-in support for GPUs. While it can schedule GPU resources using device plugins, it needs to gain the ability to manage these resources effectively. For instance, it cannot natively handle advanced GPU features such as Multi-Instance GPU (MIG) from NVDIA or GPU sharing among multiple containers.

2. Static Resource Allocation: Kubernetes allocates resources to pods statically at the time of their creation based on the resource requests and limits specified in the pod specification. This static allocation approach needs to account for the dynamic nature of GPU workloads, leading to inefficient resource utilization.

3. Lack of Finer-Grained Control: Kubernetes needs to provide fine-grained control over GPU resources. However, without knowledge of the workloads behaviors, allocating resources tailored for the workload is problematic, resulting in waste.

4. Inefficient Scheduling: Kubernetes scheduler needs visibility into the specific requirements of Application workloads. In the prior arts, most works focused on understanding a single layer, the GPU workloads (Supply Side) trending information. As a result, it may schedule a GPU-intensive application workload on a node with insufficient GPU resources, leading to suboptimal performance.

5. No holistic understanding of the workloads, platform, and resources: it is not possible to effectively and dynamically allocate proper resources to support the applications if no multilayer correlation and causal analysis is performed for the full-stack.

The rise of AI and Machine Learning (ML) workloads, which heavily rely on GPUs for their computational needs, has amplified the need for better GPU resource management in Kubernetes. These workloads have unique characteristics that pose additional challenges:

1. Dynamic Resource Needs: AI/ML workloads often have dynamic resource needs that change over time and with the data sizes. For instance, the resource requirements of a training job can vary significantly during different phases of the training process and of different data sizes.

2. High Resource Demand: AI/ML workloads are typically resource-intensive, requiring significant GPU resources. Efficient management of these resources is crucial to ensure high performance and cost-effectiveness.

3. Need for Isolation: Sharing the GPU resources among different AI/ML workloads require separation and isolation of GPU on-chip memory to prevent conflicts.

4. Long-Running Jobs: AI/ML workloads often involve long-running jobs. Any disruption in resource availability during these jobs can lead to significant delays and potential loss of computational work.

Given these challenges, there is a clear need for a solution that can provide dynamic, fine-grained management of GPU resources in Kubernetes tailored to the specific needs of AI/ML workloads. Such a solution would enable more efficient utilization of GPU resources, improved performance of AI/ML workloads, and overall cost savings.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims. The following presents a simplified summary of one or more aspects of the present disclosure to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

The present invention provides a comprehensive solution not only to overcome the aforementioned problems but also to effectively achieve the desired goal of optimizing GPU resource management/utilization in Kubernetes environments, particularly for AI/ML workloads. The present invention operates in connection with several external components: Kubernetes, GPU pooling/auto-discovery, spatial and time slicing, and NVIDIA CUDA extensions, to create a system that dynamically adjusts GPU resources based on workload prediction and makes the use of GPUs more similar to CPUs. It should be noted that the aforementioned external components are used merely as an example in the following embodiments and should not be limited thereto. Other alternatives can also be used, such as other GPUs, Cloud Services, and Resource Management Platforms.

The present invention provides a solution to enhance the capabilities and effectiveness of the aforementioned external components in the following ways:

1. The present invention is a machine learning-based platform that provides predictive resource scheduling for Kubernetes which is responsible for managing the cluster's resources based on the prediction of application workloads. By the integration of the present invention, the resource requirements of workloads can be predicted and scheduled accordingly, allowing Kubernetes to have a more accurate understanding of the resources required by each application, leading to more efficient resource allocation. This ensures that workloads receive the necessary resources when needed, improving performance and reducing resource wastage.

2. The present invention enhances Kubernetes' native capabilities to handle GPU resources and scheduling more effectively. It introduces GPU pooling and auto-discovery, allowing Kubernetes to automatically discover available GPU resources in the cluster and pool them together for use by workloads. This enables more efficient utilization of GPU resources and allows for dynamic allocation and deallocation based on workload requirements.

3. The present invention employs spatial and time-slicing techniques to maximize GPU utilization. Spatial slicing involves partitioning the GPU into smaller instances that can each be allocated to different workloads. Time slicing involves running different tasks on the same GPU instance at different time slots, allowing a GPU instance to be shared among different workloads. This combination of spatial and time slicing enables the solution to accommodate a wide range of workload requirements and adapt to changes in these requirements over time, and allows for more fine-grained control over GPU resources, ensuring that the GPU's resources are fully utilized.

4. The present invention integrates with NVIDIA CUDA, a parallel computing platform and application programming interface (API) model that allows software developers to use a CUDA-enabled graphics processing unit (GPU) for general-purpose processing. This integration allows the present invention to leverage the powerful computing capabilities of NVIDIA GPUs and the advanced features provided by CUDA extensions. This includes support for Multi-Instance GPU (MIG), which allows a single GPU to be partitioned into multiple instances that different workloads can use independently. By integrating these extensions, the solution can take full advantage of the capabilities of NVIDIA GPUs to optimize resource utilization.

5. The present invention revolutionizes the way GPUs are managed in Kubernetes. By providing dynamic, fine-grained control over GPU resources, it makes the use of GPUs more similar to CPUs. This allows for more efficient utilization of resources, improved performance of AI/ML workloads, and overall cost savings. Furthermore, the solution's predictive scheduling capabilities enable it to proactively anticipate workload requirements and allocate resources, enhancing its efficiency and effectiveness.

6. The present invention performs cascade causal analysis and translates the application workload data into GPU resource requirements. This process considers the application's specific needs, such as the amount of memory and GPU resource required. This ensures that the allocated resources are fitting to meet the application's needs, thereby preventing over-provisioning and under-provisioning of resources.

7. The present invention continuously monitors the application workload and dynamically adjusts the allocated GPU resources based on the workload prediction of the present invention. This ensures that the application always has the necessary resources to function optimally, and unused resources can be reallocated to other applications that need them.

In one aspect, the present invention provides a method for optimizing graphics-processing unit (GPU) utilization which includes the following steps: receiving an application workload which is to be executed on the GPU; predicting GPU resource requirements for the application workload; scheduling the application workload according to the prediction of the GPU resource requirements; dynamically allocating and deallocating GPU resources based on the prediction of the GPU resource requirements for the application workload; and executing the application workload on the GPU.

Preferably, the method further includes a step of continuously monitoring the availability of the GPU resources and pooling available clusters of the GPU together for use.

Preferably, the availability of the GPU resources is monitored by an open-source monitoring system.

Preferably, the method further includes a step of spatial slicing the GPU into smaller partitions for allocation of different workloads and time-slicing the partitions allowing the partitions to be shared among workloads at different times.

Preferably, each of the partitions has its own high-bandwidth memory, cache, and compute cores.

Preferably, the GPU resource requirements for the application workload are predicted by cascade causal analysis.

Preferably, the GPU resource requirements for the application workload are predicted via multi-layer correlations.

Preferably, the GPU comprises Multi-Instance GPU (MIG), Multi-Process Service (MPS) GPU, and Compute Unified Device Architecture (CUDA) GPU.

Preferably, the GPU resource requirements for the application workload are predicted by the following steps: a) deploy and install an application on multiple nodes; b) periodically collect workloads of the application and resource usage in the nodes, and calculate correlation values of resource usage for the application and the sub-application; c) use a time series model to predict the application's workload at a future time point (T+1) based on the current time point (T) and the past time points (T-1, T-2, ... T-n) and identify resources with high correlation values above a specified threshold; and d) develop a predictive model for resource usage which uses past resource usage data and predicted application workload at time point T+1 to estimate resource usage increments for the identified resource from step c.

Preferably, the correlation values are calculated by measuring similarity using collected resource usage and application workloads, if the similarity value is negative, consider its absolute value, wherein the similarity value is derived from cosine calculations using vectors composed of changes in resource usage and application workloads over three consecutive time points.

In another aspect, the present invention provides a system for optimizing graphics-processing unit (GPU) utilization which includes: an application unit, for receiving an application workload which is to be executed on the GPU based on a user request; a GPU infrastructure, including a plurality of GPU clusters; a VM/Kubernetes platform, connected to the application unit and the GPU infrastructure, for managing the plurality of GPU clusters in the GPU infrastructure and scheduling the application workload which is to be executed on the GPU; and a managing and predicting unit, connected to the application unit, the GPU infrastructure and the VM/Kubernetes platform, for predicting GPU resource requirements for the application workload; providing scheduling of the application workload according to the prediction of the GPU resource requirements to the VM/Kubernetes platform; and dynamically allocating and deallocating GPU resources based on the prediction of the GPU resource requirements for the application workload via the VM/Kubernetes platform.

Preferably, the managing and predicting unit continuously monitors the availability of the GPU resources of the GPU infrastructure and pooling available GPU clusters together for use.

Preferably, the availability of the GPU resources is monitored by an open-source monitoring system.

Preferably, the GPU clusters are spatial sliced into smaller partitions for allocation of different workloads and the partitions are time-sliced allowing the partitions to be shared among workloads at different times based on the prediction of the managing and predicting unit.

Preferably, each of the partitions has its own high-bandwidth memory, cache, and compute cores.

Preferably, the GPU resource requirements for the application workload are predicted by cascade causal analysis.

Preferably, the GPU resource requirements for the application workload are predicted via multi-layer correlations.

Preferably, the GPU infrastructure comprises Multi-Instance GPU (MIG), Multi-Process Service (MPS) GPU, and Compute Unified Device Architecture (CUDA) GPU.

Preferably, the GPU resource requirements for the application workload are predicted by the following steps: a) deploy and install an application on multiple nodes; b) periodically collect workloads of the application and resource usage in the nodes, and calculate correlation values of resource usage for the application and the sub-application; c) use a time series model to predict the application's workload at a future time point (T+1) based on the current time point (T) and the past time points (T−1, T−2, . . . T−n) and identify resources with high correlation values above a specified threshold; and d) develop a predictive model for resource usage which uses past resource usage data and predicted application workload at time point T+1 to estimate resource usage increments for the identified resource from step c.

Preferably, the correlation values are calculated by measuring similarity using collected resource usage and application workloads, if the similarity value is negative, consider its absolute value, wherein the similarity value is derived from cosine calculations using vectors composed of changes in resource usage and application workloads over three consecutive time points.

BRIEF DESCRIPTION OF THE DRAWINGS

FIG. 2 is a flowchart illustrating a method for optimizing GPU utilization in the Kubernetes environment according to an embodiment of the present invention.

DETAILED DESCRIPTION OF THE PREFERRED EMBODIMENTS

The present invention will now be described more specifically with reference to the following embodiments. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form to avoid obscuring such concepts.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

The present invention provides a system and method for optimizing GPU utilization that can be implemented in a real-world environment where Kubernetes orchestrates containerized applications that require GPU resources. This includes environments where AI/ML workloads are prevalent, such as data centers, research institutions, and cloud service providers.

Figure 1:
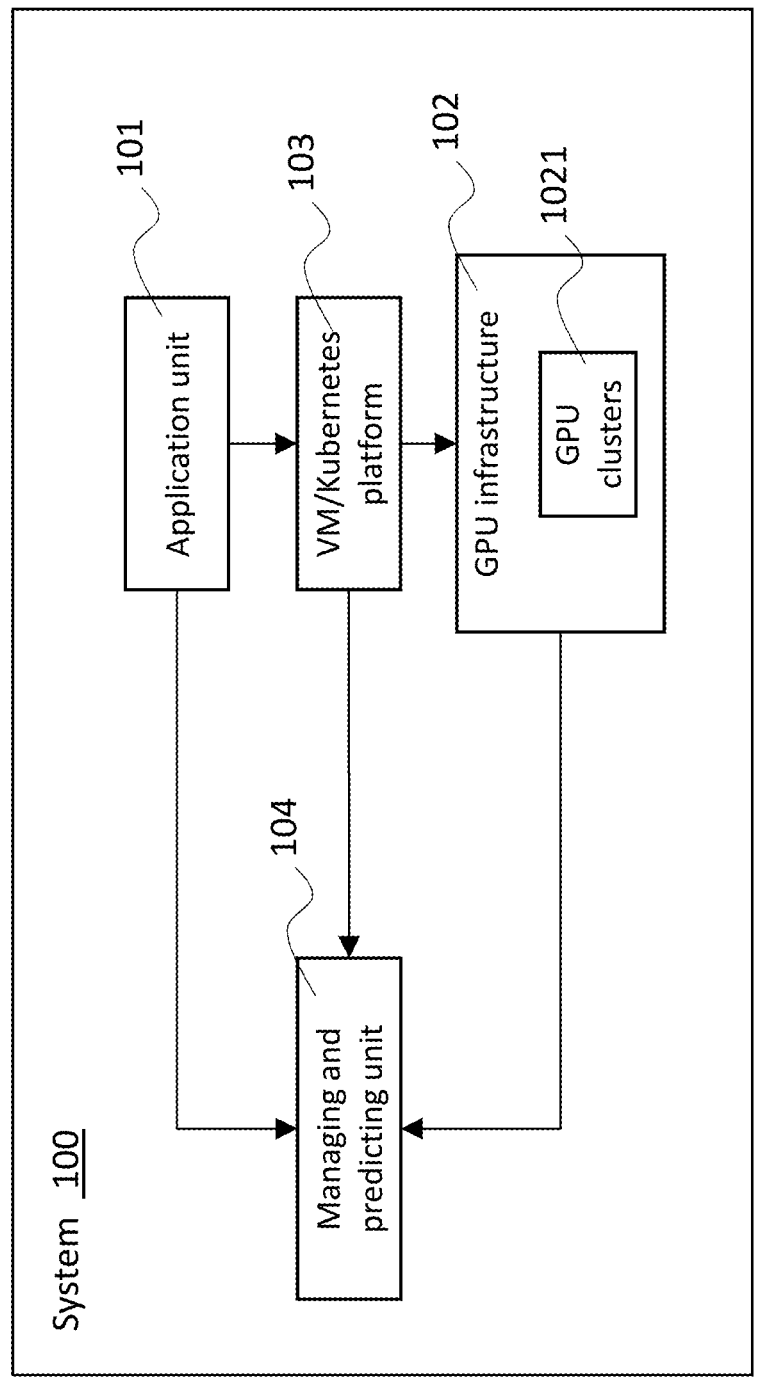
FIG. 1 is a block diagram illustrating the major components of a system for optimizing GPU utilization in the Kubernetes environment according to an embodiment of the present invention.

FIG. 1 is a block diagram illustrating major components of a system 100 for optimizing GPU utilization in a Kubernetes environment according to an embodiment of the present invention. As shown, the system 100 includes: an application unit 101, a GPU infrastructure 102, a VM/Kubernetes platform 103, and a managing and predicting unit 104. The GPU infrastructure includes multiple GPU clusters 1021. In this embodiment, NVIDIA's Multi-Instance GPU (MIG), Multi-Process Service (MPS) GPU and Compute Unified Device Architecture (CUDA) GPU are included but not limited thereto in the GPU infrastructure. Although NVIDIA's MIG allows a single GPU to be partitioned into multiple instances along with MPS being able to be time sliced, it is not possible to effectively and dynamically allocate proper resources to support the application workloads without the holistic view of the full-stack, from workloads, platform, to the GPU resources of the present invention.

The application unit 101 receives an application workload which is to be executed on the GPU based on a user request. The VM/Kubernetes platform 103 is connected to the application unit 101 and the GPU infrastructure 102, for managing the GPU clusters 1021 in the GPU infrastructure 102 and scheduling the application workload which is to be executed on the GPU. The managing and predicting unit 104 is connected to the application unit 101, the GPU infrastructure 102 and the VM/Kubernetes platform 103, for predicting GPU resource requirements for the application workload; providing scheduling of the application workload according to the prediction of the GPU resource requirements to the VM/Kubernetes platform 103; and dynamically allocating and deallocating GPU resources based on the prediction of the GPU resource requirements for the application workload via the VM/Kubernetes platform 103. In other words, the present invention provides a way to dynamically adjust GPU resources based on real-time workload requirements ensures optimal utilization. This dynamic nature contrasts Kubernetes' traditional static allocation, leading to more efficient GPU usage.

The present invention considers the workloads (demands) and GPU Resources (Supplies), ensuring that GPUs are fully utilized and not idle by predicting application workloads and dynamically adjusting GPU resources. This leads to significant cost savings, especially in environments where GPU resources are expensive. In comparison to existing prior arts, the present invention showcases several distinctive features, including the integration of the managing and predicting unit 104 for workload prediction and the dynamic adjustment of GPU resources. Additionally, the spatial and time-slicing techniques, integration with NVIDIA CUDA extensions, and GPU pooling/autodiscovery mechanism contribute to a more comprehensive and fine-tuned approach to optimizing GPU utilization. The managing and predicting unit 104 is a platform that uses machine learning to predict application workloads and optimize resource allocation in Kubernetes environments. It provides a practical example of how machine learning can be used to manage resources in a complex system.

Figure 3:
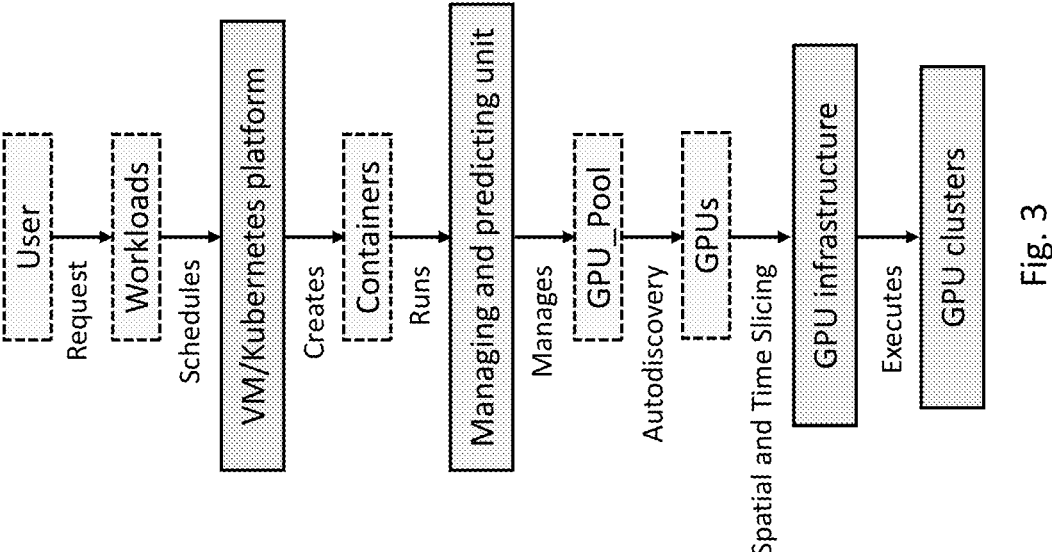
FIG. 3 is a conceptual overview of the method according to an embodiment of the present invention.
Figure 4:
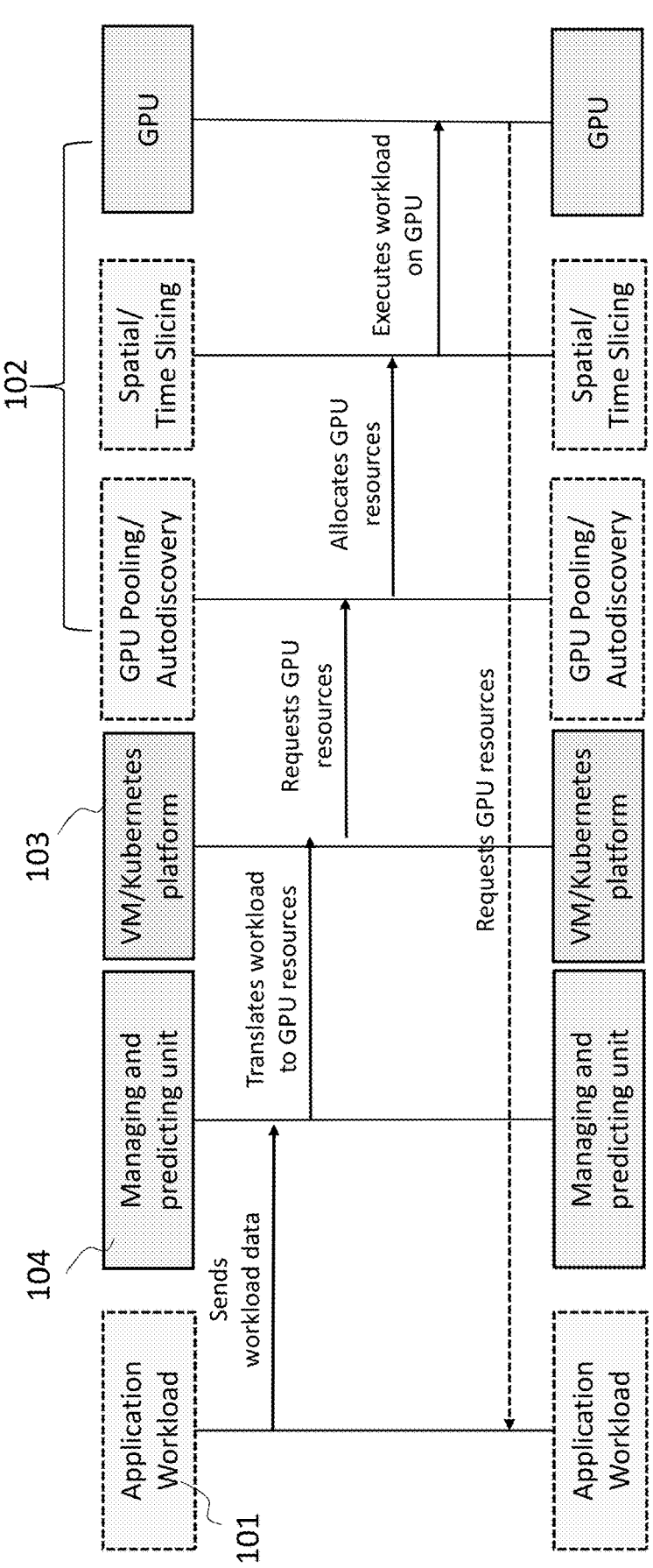
FIG. 4 is another conceptual overview of the method according to an embodiment of the present invention.

For a better understanding of the present invention, please refer to FIG. 2 which is a flowchart illustrating a method for optimizing GPU utilization in Kubernetes environment according to an embodiment of the present invention, and FIGS. 3 and 4 which provides conceptual overviews of the method.

The present invention introduces a comprehensive method for optimizing GPU utilization in Kubernetes environments. The method is orchestrated through a series of steps, each contributing to the overall efficiency of GPU resource allocation and application execution.

Step S01: The application unit 101 receives user-initiated requests for executing application workloads on GPUs. This step forms the cornerstone of the entire methodology, as user intent drives the orchestration process. Step S02: The managing and predicting unit 104 predicts GPU resource requirements for the application workload, thereby providing a predictive foundation for subsequent steps. Step S03: Leveraging the GPU resource predictions from Step S02, the managing and predicting unit 104 schedules the application workload. This ensures that GPU resources are allocated optimally, aligning with the predicted requirements. Step S04: The managing and predicting unit 104 manages GPU resource allocation and deallocation based on the predictive insights. This adaptable orchestration guarantees the efficient use of GPU resources, dynamically scaling to accommodate changing needs. Step S05: With the symphony of orchestration complete, the application workload is executed on the GPU, delivering the desired output with optimal performance.

In this embodiment, the method further includes a step of continuous monitoring of GPU resource availability within the GPU infrastructure 102. The available GPU clusters 1021 are pooled together to ensure resource utilization maximization. Furthermore, the method incorporates the option of monitoring GPU resources using the managing and predicting Unit 104 or utilizing open-source monitoring systems such as Prometheus. Prometheus, a dimensional data model-based system with flexible querying and efficient time series databases, augments the monitoring process.

The invention embraces the technique of spatial slicing, whereby GPU clusters 1021 are partitioned into smaller units for allocation of different workloads. This partitioning enhances workload allocation efficiency. Complementing spatial slicing, time slicing enables partitions to be shared among various workloads at different times, all orchestrated by predictive insights from the managing and predicting unit 104. Each partition is equipped with its own high-bandwidth memory, cache, and compute cores.

Additionally, the invention presents a method for predicting GPU resource requirements using cascade causal analysis and/or multi-layer correlations. The embodiment demonstrates a specific example of multi-layer correlations, involving deployment on multiple nodes, periodic data collection, time series modeling, and resource usage estimation based on cosine calculations of correlation values.

Below is an example of how the GPU resource requirements for the application workload can be predicted via multi-layer correlations. It could be predicted by the following steps: a) deploy and install an application on multiple nodes; b) periodically collect workloads of the application and resource usage in the nodes, and calculate correlation values of resource usage for the application and the sub-application; c) use a time series model to predict the application's workload at a future time point (T+1) based on the current time point (T) and the past time points (T−1, T−2, . . . T−n) and identify resources with high correlation values above a specified threshold; and d) develop a predictive model for resource usage which uses past resource usage data and predicted application workload at time point T+1 to estimate resource usage increments for the identified resource from step c. Specifically speaking, the correlation values are calculated by measuring similarity using collected resource usage and application workloads, if the similarity value is negative, consider its absolute value, wherein the similarity value is derived from cosine calculations using vectors composed of changes in resource usage and application workloads over three consecutive time points.

Figure 5:
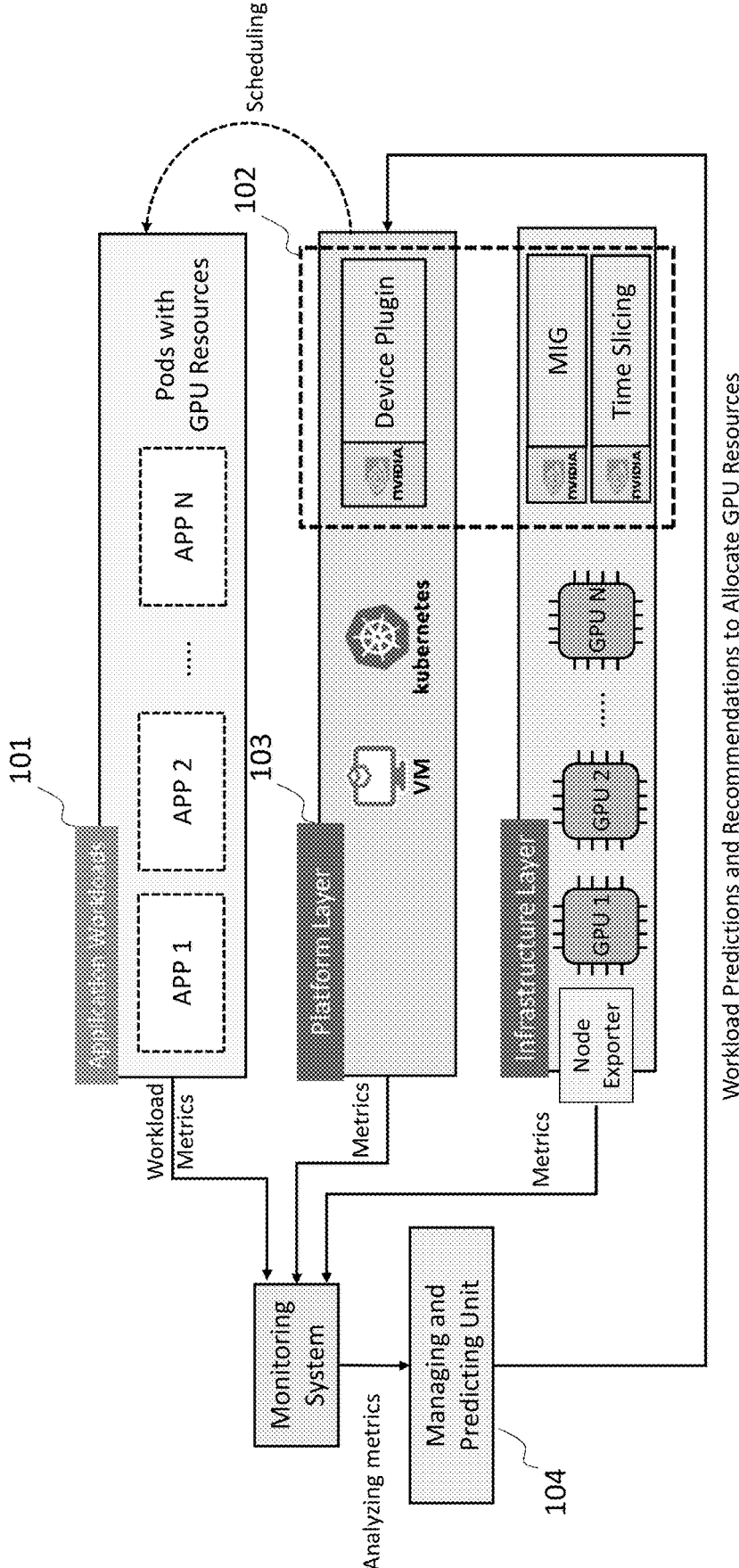
FIG. 5 is a conceptual diagram of the system according to an embodiment of the present invention.

For a more detailed understanding of the present invention, please refer to FIG. 5 which is a conceptual diagram of the system according to an embodiment of the present invention.

In this embodiment, the managing and predicting unit 104 is deployed in the VM/Kubernetes platform 103 and is configured to monitor application workloads and predict resource requirements. This would involve setting up the managing and predicting unit 104 operator and configuring it to monitor the relevant applications. In control by the managing and predicting unit 104, the VM/Kubernetes platform 103 is configured to pool GPU resources and automatically discover new GPUs as they are added. This could be achieved using existing VM/Kubernetes platform 103 features and NVIDIA's GPU operator.

By use of NVIDIA's Multi-Instance GPU (MIG), the present invention is able to incorporate spatial and time slicing into GPUs by configuring the GPUs to enable MIG and setting up the VM/Kubernetes platform 103 scheduler to allocate MIG instances to pods. By use of NVIDIA's CUDA and its Extensions, the present invention could leverage NVIDIA CUDA and its extensions to optimize GPU utilization by configuring the applications to use CUDA and ensuring that the VM/Kubernetes platform 103 scheduler is aware of the CUDA capabilities of the GPUs. In other words, the present invention allows multiple workloads to share a single GPU by pooling GPUs and using spatial and time slicing. This not only maximizes the utilization of GPU resources but also allows for a more fine-grained allocation of GPU resources. The GPU pooling and autodiscovery mechanism streamline the management of GPU resources, thereby reduces administrative overhead and simplifies the process for IT teams.

The present invention could optimize GPU utilization in a data center or GPU Cloud Service running multiple AI/ML workloads. By predicting the GPU requirements of each workload and dynamically adjusting the GPU resources allocated to each pod, the present invention could ensure that GPUs are fully utilized, and workloads are not starved of resources. In other words, the present invention ensures that AI/ML workloads get the GPU resources they need when they need them. This leads to improved performance and faster completion of tasks.

In a scenario where workloads have variable GPU requirements, the present invention could dynamically adjust the GPU resources allocated to each pod based on the predicted workload. This would prevent over-provisioning and under-provisioning of GPU resources.

In a cloud service provider environment where GPU resources are expensive and limited, the present invention could ensure these resources are used efficiently. By pooling GPUs and using spatial and time slicing, the present invention could allow multiple workloads to share a single GPU, thereby maximizing the utilization of the GPU resources. The present invention integrates seamlessly with VM/Kubernetes platform 103 and NVIDIA CUDA, making it easy to implement in existing environments.

The present invention not only improves GPU utilization but also provides better performance for AI/ML workloads, and cost savings due to more efficient use of GPU resources. The invention could revolutionize how GPUs are managed in Kubernetes environments by providing a solution that optimizes GPU utilization and improves the performance of AI/ML workloads. It could set a new standard for GPU resource management and pave the way for more efficient and cost-effective use of GPU resources in cloud environments.

In conclusion, the proposed solution offers a holistic approach to GPU resource management in Kubernetes environments. It addresses the current limitations of Kubernetes in managing GPU resources and introduces innovative techniques to optimize GPU utilization. As AI/ML workloads grow in importance and complexity, solutions like this will ensure that they run efficiently and effectively in containerized environments.

It is to be understood that the specific order or hierarchy of steps in the methods disclosed is an illustration of exemplary processes and may be rearranged based upon design preferences. The accompanying method claims present elements of the various steps in a sample order, and are not meant to be limited to the specific order or hierarchy presented unless specifically recited therein.

Although embodiments have been described herein with respect to particular configurations and sequences of operations, it should be understood that alternative embodiments may add, omit, or change elements, operations and the like. Accordingly, the embodiments disclosed herein are meant to be examples and not limitations.

What is claimed is:

1. A method for optimizing graphics-processing unit (GPU) utilization, comprising the following steps:

receiving by an application unit an application workload which is to be executed on the GPU based on a user request; a GPU infrastructure, including a plurality of GPU clusters, a virtual machine (VM)/Kubernetes platform, connected to the application unit and the GPU infrastructure, for managing the plurality of GPU clusters in the GPU infrastructure and predicting GPU resource requirements for the application workload by using a managing and predicting unit, connected to the application unit, the GPU infrastructure, and the VM/Kubernetes platform;

providing scheduling the application workload according to the prediction of the GPU resource requirements to the VM/Kubernetes platform;

dynamically allocating and deallocating GPU resources based on the prediction of the GPU resource requirements for the application workload via the VM/Kubernetes platform; and executing the application workload on the GPU;

wherein the GPU resource requirements for the application workload are predicted by the following steps:

a) deploy and install an application on multiple nodes;

b) periodically collect workloads of the application and resource usage in the nodes, and calculate correlation values of resource usage for the application and the sub-application;

c) use a time series model to predict the application's workload at a future time point (T+1) based on current time point (T) and past time points (T−1, T−2, . . . T−n)

and identify resources with high correlation values above a specified threshold; and d) develop a predictive model for resource usage which uses past resource usage data and predicted application workload at time point T+1 to estimate resource usage increments for the identified resource from step c.

2. The method according to claim 1, further comprising a step of continuously monitoring the availability of the GPU resources and pooling available clusters of the GPU together for use.

3. The method according to claim 2, wherein the availability of the GPU resources is monitored by an open-source monitoring system.

4. The method according to claim 1, further comprising a step of spatial slicing the GPU into smaller partitions for allocation of different workloads and time slicing the partitions allowing the partitions to be shared among workloads at different times.

5. The method according to claim 4, wherein each of the partitions has its own high-bandwidth memory, cache, and compute cores.

6. The method according to claim 1, wherein the GPU resource requirements for the application workload are predicted by cascade causal analysis.

7. The method according to claim 1, wherein the GPU resource requirements for the application workload are predicted via multi-layer correlations.

8. The method according to claim 1, wherein the GPU comprises Multi-Instance GPU (MIG), Multi-Process Service (MPS) GPU, and Compute Unified Device Architecture (CUDA) GPU.

9. The method according to claim 1, wherein the GPU resource requirements for the application workload are predicted by the following steps: a) deploy and install an application on multiple nodes; b) periodically collect workloads of the application and resource usage in the nodes, and calculate correlation values of resource usage for the application and the sub-application; c) use a time series model to predict the application's workload at a future time point (T+1) based on the current time point (T) and the past time points (T−1, T−2, . . . T−n) and identify resources with high correlation values above a specified threshold; and d) develop a predictive model for resource usage which uses past resource usage data and predicted application workload at time point T+1 to estimate resource usage increments for the identified resource from step c.

10. The method according to claim 9, wherein the correlation values are calculated by measuring similarity using collected resource usage and application workloads, if the similarity value is negative, consider its absolute value, wherein the similarity value is derived from cosine calculations using vectors composed of changes in resource usage and application workloads over three consecutive time points.

11. A system for optimizing graphics-processing unit (GPU) utilization, comprising:

an application unit, for receiving an application workload which is to be executed on the GPU based on a user request;

a GPU infrastructure, including a plurality of GPU clusters;

a virtual machine (VM)/Kubernetes platform, connected to the application unit and the GPU infrastructure, for managing the plurality of GPU clusters in the GPU infrastructure and scheduling the application workload which is to be executed on the GPU; and a managing and predicting unit, connected to the application unit, the GPU infrastructure, and the VM/Kubernetes platform, for predicting GPU resource requirements for the application workload;

providing scheduling of the application workload according to the prediction of the GPU resource requirements to the VM/Kubernetes platform; and dynamically allocating and deallocating GPU resources based on the prediction of the GPU resource requirements for the application workload via the VM/Kubernetes platform;

wherein the GPU resource requirements for the application workload are predicted by the following steps: a) deploy and install an application on multiple nodes;

b) periodically collect workloads of the application and resource usage in the nodes, and calculate correlation values of resource usage for the application and the sub-application;

c) use a time series model to predict the application's workload at a future time point (T+1) based on current time point (T) and past time points (T−1, T−2, . . . T−n) and identify resources with high correlation values above a specified threshold; and d) develop a predictive model for resource usage which uses past resource usage data and predicted application workload at time point T+1 to estimate resource usage increments for the identified resource from step c.

12. The system according to claim 11, wherein the managing and predicting unit continuously monitors the availability of the GPU resources of the GPU infrastructure and pooling available GPU clusters together for use.

13. The system according to claim 12, wherein the availability of the GPU resources is monitored by an open-source monitoring system.

14. The system according to claim 11, wherein the GPU clusters are spatial sliced into smaller partitions for allocation of different workloads and the partitions are time sliced allowing the partitions to be shared among workloads at different times based on the prediction of the managing and predicting unit.

15. The system according to claim 14, wherein each of the partitions has its own high-bandwidth memory, cache, and compute cores.

16. The system according to claim 11, wherein the GPU resource requirements for the application workload are predicted by cascade causal analysis.

17. The system according to claim 11, wherein the GPU resource requirements for the application workload are predicted via multi-layer correlations.

18. The system according to claim 11, wherein the GPU infrastructure comprises Multi-Instance GPU (MIG), Multi-Process Service (MPS) GPU and Compute Unified Device Architecture (CUDA) GPU.

19. The system according to claim 11, wherein the correlation values are calculated by measuring similarity using collected resource usage and application workloads, if the similarity value is negative, consider its absolute value, wherein the similarity value is derived from cosine calculations using vectors composed of changes in resource usage and application workloads over three consecutive time points.

* * * * *